United States Patent [19] Auger

[11] 4,237,597

[45] Dec. 9, 1980

[54] PROCESS FOR THE ASSEMBLY OF SHAPED LEAVES

[75] Inventor: Henri R. Auger, Le Vesinet, France

[73] Assignee: Saint-Gobain Industries, Neuilly-sur-Seine, France

[21] Appl. No.: 954,285

[22] Filed: Oct. 24, 1978

Related U.S. Application Data

[63] Continuation-in-part of Ser. No. 809,017, Jun. 22, 1977, Pat. No. 4,134,238.

[30] Foreign Application Priority

Jun. 24, 1976 [Fr] France .......................... 76-19189

[51] Int. Cl.[3] ...................... B29D 12/00; B29C 27/00; B29C 27/30

[52] U.S. Cl. .................................... 29/526 R; 156/92; 264/252; 264/261; 264/267

[58] Field of Search ............... 264/261, 263, 267, 271, 264/250, 251, 252; 156/99, 107, 71, 91, 92; 428/14, 358; 52/397, 656, 788, 789, 399-403, 821-826, 127, 217; 29/460, 527.2

[56] References Cited

U.S. PATENT DOCUMENTS

| | | | |
|---|---|---|---|
| 1,572,831 | 2/1926 | Ayres | 52/656 |
| 2,633,946 | 4/1953 | Huizenga | 52/627 |
| 2,668,032 | 2/1954 | Haefner | 52/825 |
| 2,718,664 | 9/1955 | Schweitzer | 264/261 |
| 2,874,423 | 2/1959 | Berg | 52/399 |
| 2,983,001 | 5/1961 | Guldager | 52/217 |
| 3,263,014 | 7/1966 | Delsenroth | 264/261 |
| 3,387,416 | 6/1968 | Martin | 52/403 |
| 3,404,501 | 10/1968 | Von Wedel | 52/127 |
| 3,427,776 | 2/1969 | Lake et al. | 52/403 |
| 3,659,896 | 5/1972 | Smith et al. | 52/403 |

FOREIGN PATENT DOCUMENTS

| | | | |
|---|---|---|---|
| 1433252 | 2/1966 | France | 52/399 |
| 2165823 | 10/1973 | France . | |
| 2227778 | 11/1974 | France . | |
| 2228385 | 11/1974 | France . | |
| 461759 | 10/1968 | Switzerland . | |
| 1166844 | 10/1969 | United Kingdom | 52/788 |
| 1251592 | 10/1971 | United Kingdom | 52/788 |

*Primary Examiner*—W. E. Hoag
*Attorney, Agent, or Firm*—Pennie & Edmonds

[57] ABSTRACT

A process for making a panel having a supported member formed either of a simple or multiple glass window and a supporting part formed of preformed parts received on and at spaced locations around the glass window for supporting a light frame thereby to accommodate the panel for use as a window or door.

14 Claims, 13 Drawing Figures

FIG. 6.
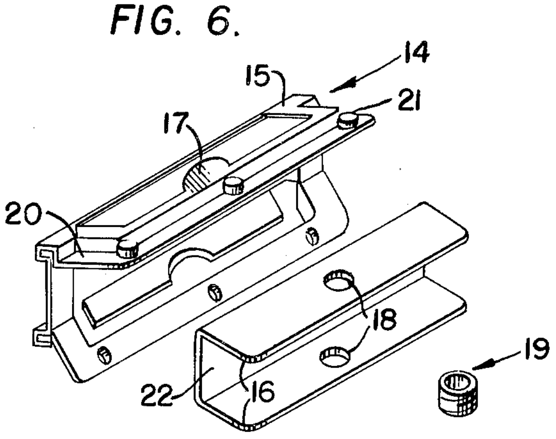
FIG. 8.
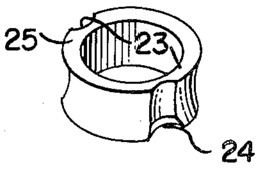
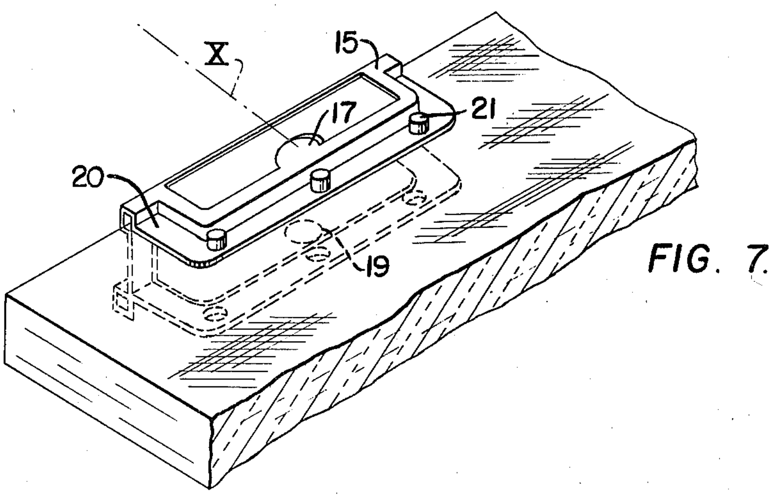
FIG. 7.
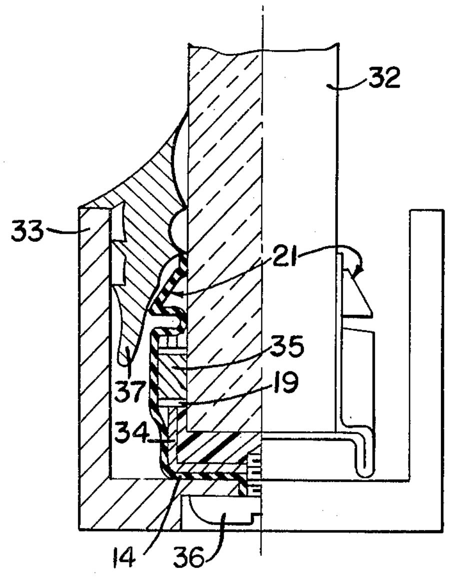
FIG. 10.

PROCESS FOR THE ASSEMBLY OF SHAPED LEAVES

CROSS REFERENCE TO RELATED APPLICATIONS

This application is a continuation-in-part of application Ser. No. 809,017, filed June 22, 1977, now U.S. Pat. No. 4,134,238, which is hereby incorporated by reference.

BACKGROUND OF THE INVENTION

The present invention relates to a process for making a panel such as a leaf having a supported member comprised of a glazed part either of a simple or multiple sheet construction to accommodate the panel for use as a window or a door capable of swinging, oscillating or sliding movement and a supporting part member comprised, for example, of shaped parts.

Panels which comprise a supporting frame and a glass window which is mounted by the supporting frame and secured by a mastic capable of providing both a mechanical bond and seal between the supporting frame and the glass window are known in the prior art. These panels, however, have not recognized an acceptance because of costs in fabrication. To this end, it was considered that the supporting frame need be comprised of strong constituent components thereby to provide the panel with the dimensional stability and mechanical strength required for use. The constituent components of such supporting frames often are relatively expensive. Furthermore, the techniques followed in the process of assembling such panels to assure that the supporting frame does not impart undue mechanical stress to the edges of the glass window are of a precision nature, introducing a measure of added cost.

Thus, it has been suggested to employ a simple frame which may be glued or bonded directly and rigidly on the glass window generally with a hard mastic, wherein the rigidity of the panel derives from the glass window rather than the frame. The simple frame may be much lighter than the frame of the panel described above and may consist of shaped parts of thin cross section. The shaped parts have been formed of wood, plastic, a light alloy, and so forth. The hard mastic forms a rigid bond to the edges of the glass window over their entire length and the junctions in the angles are provided without any special contrivance.

Some glass windows are of double thickness, formed by a pair of glass parts which have welded edges. Oftentimes there are irregularities along the welded edges and it has been suggested that such irregularities may be corrected by receipt of one or more pads therealong and then subjecting the pad or pads to a machining operation to create a rectilinear edge. The frame then may be received on the glass window and centered by the rectilinear edge preparatory to other operations.

It is necessary to prevent mechanical stress along the edges of a glass window, particularly the welded edges of double thickness glass windows. A supporting frame of the former type, while it could be used in fabrication of the panel, would continue to suffer from the problems of expense which would be increased by costly expenses of machining. And, if a simple frame were used in fabrication it still would be glued directly and rigidly onto the faces of the glass window along the edges with the attendant problems of introduced mechanical stress. Thus, the double thickness glass windows are not sufficiently freed from the problems associated with the fragility of their edges.

Processes utilizing simple frame panels have advantages over the prior art panels fabricated with a rigid supporting frame generally in the area of the costs involved. However, they also have various drawbacks which are important in the overall view of the prior art. In particular, the known manufacture of the panel militates against the recovery of parts in the event of breakage of the glass window. Furthermore, the assembly of the panel requires a great deal of care and precision to reduce the mechanical stress along the edges of the glass window and they are not always subject to mass production techniques because of the variation in size of the glass window. Since mass production techniques are not always possible it has been necessary to carry out the assembly of panels of this type at the site of the operation, rather than in the factory, and as such the assembly requires the availability at the site of specialized workshops and qualified personnel. This all results in a rather low production rate and a rather high cost of a finished product.

SUMMARY OF THE INVENTION

The present invention seeks to overcome the various problems as noted above in connection with a fabrication process for panels including a supported member such as a glass member, either a simple or multiple glass window, and a support such as a frame which may comprise a number of shaped parts. The supporting frame includes an overlapping element such as a plurality of U-shaped preformed parts received on the glass member at spaced locations and in straddling fashion therearound and light frame elements which are received by the preformed parts. The preformed parts are glued to the glass member. The preformed parts carry movable fastening means for receipt of the light frame elements thereon.

It has been noted that good rigidity of the panel is compatible with the adoption of very moderate dimensions for the preformed parts, thus providing for their easy insertion into the frame itself of moderate dimensions to the extent that the gluing covers a sufficient surface at the level of the wings of the preformed parts. The stresses to which these are subjected are indeed generally much lower than the breaking point of the glued assembly, the latter working essentially through elastic shearing at right angles to the wings.

According to another characteristic of the invention, by combining the use of hard glue studs of high mechanical strength such as an epoxy resin with that of a flexible elastic glue such as a polysulfide generally having a lower mechanical strength, it is possible to provide the preformed parts with a structure allowing it to be set to the glass window.

The object of the improvement is to reinforce the attachment of the preformed parts for certain applications in which they may be subjected to particularly large stresses. This is the case, for example, when such a preformed part is used for the attachment of a door hinge to the panel.

More specifically, according to this advantageous embodiment, the preformed part comprises, in at least one of its wings, at least one socket bearing against the external face of the glass window and forming, in succession, a barrier for the flexible glue upon its injection, then a mold for the hard glue stud to be provided on said external face and finally an anchoring means on said stud after the setting of this hard glue.

Preferably, the socket is substantially in the form of a circular cylinder the axis of which is normal to the glass window. This may be a part which is separate from the preformed part which is adjusted into its wing but it is also possible to produce, by stamping, preformed parts whose wings comprise punctures forming sockets.

In general, the attachment of the preformed parts to the glass window is performed as soon as possible in the factory, using a glue of the "elastic" type; whereas, only the injection of the glue of the "hard glue" type into the sockets of the preformed parts is effected on the assembly site.

The present invention relates to a process for

I. placing the preformed parts,

II. using a semi-rigid casing, which facilitates the injection of the flexible glue and which may subsequently provide, in particular, for the protection of the preformed part or even act as an intermediate joint for the assembly of the panel, III. injecting the flexible glue.

The advantages of the invention will be seen in greater detail below both as regards suitability for industrialization and standardization of factory operations and the diversity of choice and ease of application of the parts to be used for the production of the frame on the site itself.

DESCRIPTION OF THE FIGURES

These and other aspects of the invention as will be described below will be better understood through the following description which may be considered in connection with the figures of the drawing which are as follows:

FIG. 6 is a view similar to FIG. 2 illustrating a further form of preformed part and casing;

FIG. 7 is a view similar to FIG. 4 yet illustrating the components of FIG. 6;

FIG. 8 is an enlarged perspective view of a socket member;

FIG. 10, on the left side, is a view in section along the line X in FIG. 7;

DESCRIPTION OF THE PREFERRED EMBODIMENT

Figure 1:
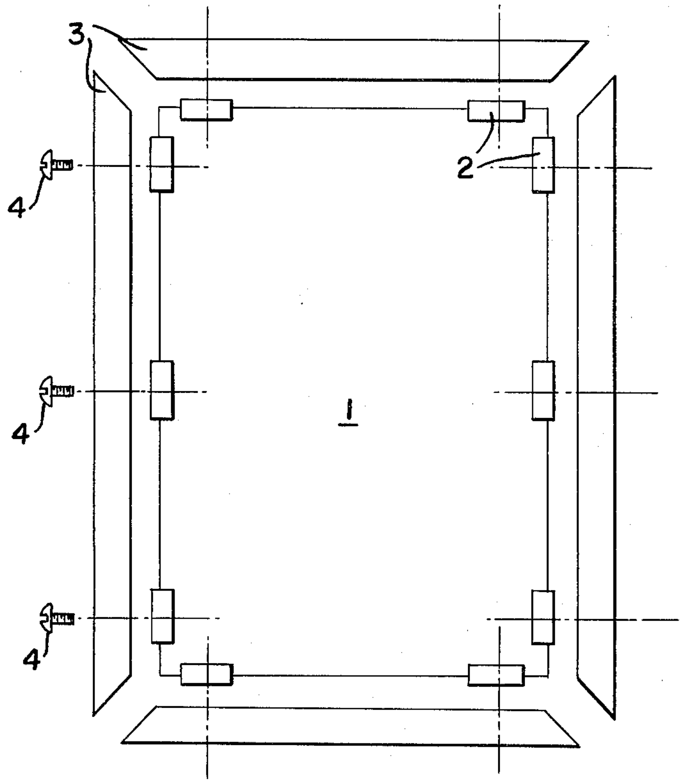
FIG. 1 is a plan view illustrating very generally the component parts of the panel of the present invention and, particularly, the disposition of the component parts preparatory to assembly.

FIG. 1 is a schematic representation at one stage in the process of assembly of a panel or leaf which may be employed as a window or door of the swing, oscillating or sliding variety. The panel generally comprises a section of sheet material 1 having good optical transmission properties, preferably a glass sheet, a plurality of preformed parts 2 (hereinafter referred to as a "rider") disposed at spaced locations around the perimeter of the glass sheet and a plurality of parts 3 including a pair of upright members and a pair of cross members forming a frame.

The riders 2 as will be brought out in detail below are adhered to the glass sheet at spaced locations around its edge. The rider may take many shapes. For example, the rider may be in the form of a plate thereby to be disposed adjacent a side of the glass sheet, of L-shape thereby to be disposed adjacent both the side and one face of the glass sheet to straddle the latter or of U-shape to straddle both faces of the glass sheet. A rider of U-shaped configuration has been found to provide the best mechanical behavior in the present invention in that it is best suited to allow for the interplay of shearing forces in position on the glass sheet and the material by which it is adhered provides good homogeneity of stress distribution.

Each rider 2 is immovably attached to the glass sheet and the parts 3 of the frame may be releasably attached to the respective riders along the edges of the glass sheet through one or more screws 4 received by each.

Figure 2:
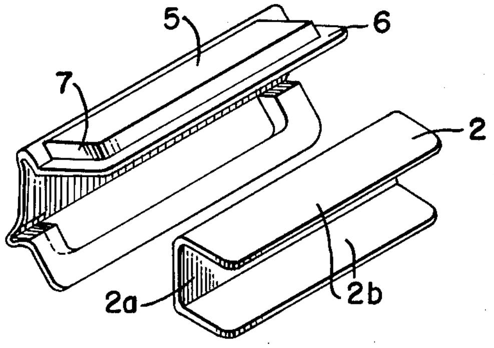
FIG. 2 is a view in perspective of a preformed part and a casing for setting the preformed part in place on a glass sheet.

As may be seen in FIG. 2 and those following, the rider 2 preferably of U-shape is in the form of a somewhat elongated member having a pair of spaced wings *2b* which may be disposed juxtaposed to opposite faces of the glass sheet and a base *2a* connecting the wings. When mounted, the base of the rider is juxtaposed to a side of the glass sheet. Preferably the wings of the rider will have a spacing which is greater than the maximum thickness of the glass sheet of any particular production run. In this manner it is possible to avoid damage to the glass sheet both through contact of the wings of the rider with the external faces during the fabrication of the panel as will be described and as a result of the effect of stress to which the panel may be subjected upon use. This is the case whether the glass sheet be of a single or multiple layers.

It has been found that a minimum clearance of less than one millimeter between the wings of the rider and the faces of the glass sheet will be sufficient for the aforementioned purposes as well as to make it possible, after a precise positioning of the rider, to obtain with certainty complete coverage of a glue film. A desirable average clearance may be on the order of 0.5 mm at the level of said lateral wings. With this order of spacing it is generally advantageous to avoid the use of a glue which is excessively fluid.

Many glues may be used for purposes of adhering the rider 2 to the glass sheet 1. The glue, however, must provide the function to which it is put, namely that it be capable of adhering a rider, preferably formed of metal or a structurally sturdy plastic, and that it have a degree of elasticity or flexibility thereby to improve the distribution or transmission of stress throughout the area of adherence. Glues of the polysulfide type are well-suited to this use.

It is with reference, among other things, to the stresses which to the greatest extent are related to the weight of the glass sheet 1, that the number, mode of distribution and characteristics of the riders 2 are determined. For example, in the case of panels of usual dimensions, an excellent binding of rider and glass sheet may be obtained by using a rider formed of thin steel plate, such as tempered spring steel and the same may be distributed along the edges of the glass sheet with a spacing on the order of 50 cm or even more. The tempered spring steel of the rider may be of a thickness on the order of about 0.5 mm, and if the rider is about 5 cm in length the lateral dimension of the wings may be about 1 to about 1.5 cm. These dimensions are by way of example, not to limit the overall invention to a particular size rider, and, of course, the spacing between the wings of the rider is determined by the maximum thickness of the glass sheet for a particular production run.

Various forms of rider 2 within this invention will be examined as to various details in connection with their function all as related to the junction characteristics between the glass sheet and the frame, as well as to the technique of manufacture of the panel in its different stages with particular attention to the stage of attachment of the rider.

Figure 3:
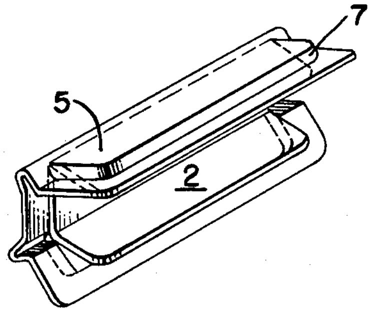
FIG. 3 is a view in perspective of the components of FIG. 2 received together before mounting.
Figure 4:
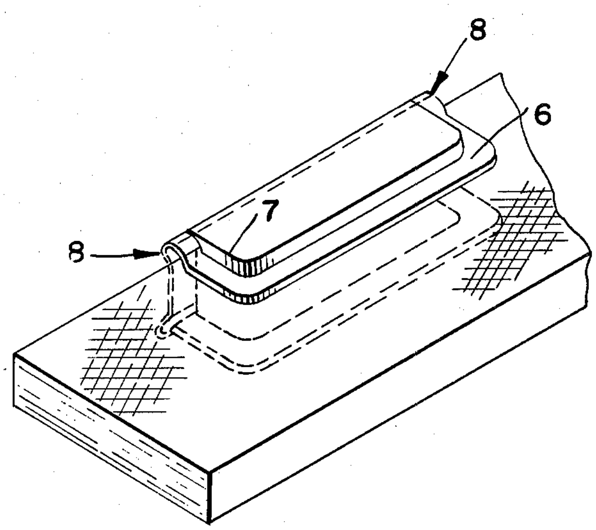
FIG. 4 is a view in perspective of the parts of FIG. 2 after having been set into place at the edge of a glass sheet.

FIGS. 2, 3 and 4 illustrate the receipt of rider 2, advantageously carried out in the factory in which the glass sheet has been formed, to the glass sheet. In this setting it is possible to carry out in succession the correct positioning of the riders and their adherence to the glass sheet under excellent conditions of reliability and cleanliness. For this purpose, there is provided a casing 5, preferably of semirigid construction and corresponding in shape to the external surface of the rider. However, the casing is of a size such that its surfaces corresponding to the base 2*a* and wings 2*b* of the rider 2 extend therebeyond. The size differential may be seen in FIGS. 3 and 4 and the receipt of the rider may be appreciated from the following discussion. Thus, the casing includes a pair of wings 5*b* including a recess or housing 7 within a frame or projecting part 6. The recesses have opposed openings.

The rider 2 and overlying casing 5 are located to the chosen place on the edge of glass sheet 1, after the latter preferably is cleaned and the frame 6 of the casing carrying a film of glue, as described, is adhered to the faces of the glass sheet (see FIG. 4). A good degree of tightness will be obtained. This operation is largely facilitated if casing 5 is coated with an adhesive material on the face in contact with the rider and the recess 7 will enclose the edges of the wings 2*b* of the rider 2. The elasticity of the adhesive material allows it to absorb deviations from the thickness specifications of the glass sheet, as in FIG. 4. Vent holes 8 preferably are provided for the thus formed mold upon gluing of the frame 6 on the glass sheet 1. The space included between the rider 2 and the glass sheet then is filled with glue by injection of the same under pressure. The injection of glue may be through a hole provided along the axis of symmetry of the rider, for example. The force of the injection of glue causes the wings 2*b* as well as the base 2*a* of rider 2 to move into the recess thereby to obtain a substantially constant thickness of an adhesive film between the wings of the rider and faces of the glass sheet. A film of adhesive also will be disposed between the base of the rider and glass sheet. While there may be a tendency of the casing to open under the forces introduced by the penetrating injection nozzle (not shown) the frame of the casing which is adhered to the glass sheet as well as the flexibility of the casing assures that the injected glue will be confined to the area of the recess.

Setting of the glue may be induced, for example, by drying. Thereafter, the casing may be disposed of, if desired.

Nevertheless, the casing may advantageously be retained until such time as the complementary components of the panel are assembled. Thus, the casing, indeed, may provide a protection for the glass sheet against external agents or against shocks. The casing, also, may be retained in position throughout complete fabrication of the panel and facilitate the disposition of certain air seals as well as provide a degree of distribution of stresses by slightly collapsing under the pressure exerted by the frame on the riders.

Materials from which a casing may be formed which are particularly well suited in the fabrication of a panel according to the invention as described in connection with FIGS. 2, 3 and 4 include polyvinyl chloride and other sheet materials which may be shaped according to the relief of the external surface of the riders, all the while retaining a degree of flexibility.

Additionally, it is advantageous that the material comprising the casing be transparent, or at least translucent. Thus, it will be possible through visual inspection to control the injection of the glue.

One form of rider 2 which is well suited for use in the present invention and with the technique described previously, may be seen in FIG. 5. This rider is U-shaped in outline including a pair of spaced wings 9, which similarly to the wings 2*b* are designed to be placed in a direction parallel to the faces of the glass sheet, and a base 10 which similarly to the base 2*a* is disposed adjacent the side of the glass sheet. In its four angles 10*a*, base 10 can advantageously be shaped as a "valise corner" so as to reinforce the right angles formed by each of the wings 9 and the base 10.

An aperture 11, designed to receive the injection nozzle, is located along the axis of symmetry of the rider. A pair of hollow ribs 12 are disposed on opposite sides of the aperture. The ribs are designed to be received against the side of the glass sheet especially under the pressure of the injection nozzle and, thus, define the position of the rider in a direction normal to the plane of the side. In addition, during the injection operation during which glue is injected into the space between the rider and the glass sheet the ribs deviate the glue flux towards the wings of the rider.

A pair of bosses 13 likewise are disposed on opposite sides of the aperture. Each boss, centrally thereof, is formed with an aperture either to retain a nut or else having its opening circumferentially therearound formed as an embedded nut 13*a*. A screw such as the screw 4 may be used to attach the frame. The bosses 13 and the ribs 12 may be stamped in the rider. The depth of stamping allows the fastening screws to penetrate by several threads into the nut 13*a* without any risk of damaging the side of the glass window.

Other and varying embodiments of rider without departing from the scope of the present invention can be envisioned. In particular, it can comprise stud-bolts as a replacement for the nuts 13*a*. However, the latter construction generally is preferred in that it is efficient and less expensive.

FIG. 6 may be likened to FIG. 2 although it illustrates a rider adapted for the setting into place of a double glued assembly. This type of assembly is particularly strong and suited to withstand very large stresses.

The rider of FIG. 6 includes a pair of spaced wings 16, each including an aperture 18, preferably circular in outline and designed to receive a socket 19. A base 22 connects the wings 16. The socket perhaps best seen in FIG. 8 is of a diameter which corresponds to its internal diameter of the aperture thereby to provide enough play to allow the socket to slide sufficiently freely.

A casing 14 comprises a projecting strip 15 forming a bellows, at right angles with and recessed from the periphery of each of the wings 16 of the rider. An ear 17 coinciding with each of the apertures 18 extends from the strip. The ear provides room for the sockets 19 which are inserted therein.

A frame or projecting part 20, as previously described, may be glued onto the glass sheet. A plurality of bosses 21 forming an incline, the upper part of which is substantially flush with the level of the bellows 15, extend from the frame. Three such bosses may be disposed along the frame as shown in FIGS. 6 and 7. If the rider was of a length different than about 5 cm it may be desired to provide a different number of bosses.

The angle of the incline is away from the plane of the casing towards the base. The bosses serve to guide a seal 37 (see FIG. 10) which may be of neoprene into disposition with frame 33.

After a possible cleaning of the glass window, a precise positioning of the rider and the gluing of the frame 20 of the casing on the faces of the glass sheet (FIG. 7), all as described, the pressure of sockets 19 on the faces of the glass sheet may be increased, for example, by means of a spring clamp (not shown). The glue of the elastic type, such as a polysulfide, then is injected through the hole in base 22 of the rider. The glue infiltrates below the wings ensuring the centering of the rider but without filling the interior of the sockets 19.

When the riders in a number as set out have been placed on the glass sheet and the glue has been injected, it is generally advantageous to effect the "setting" of the elastic glue before proceeding with the introduction of the glue of the "hard glue" type, such as an epoxy resin, into the sockets 19. Thus, the risk of accidential displacement of the rider, or the spreading of the glue outside the space reserved to it may be reduced. Furthermore, it may be advantageous to inject the epoxy resin, as far as possible, only during the panel assembly operations, after its setting into place or more generally when the riders have taken up their final position so as to get a maximum benefit from the play resulting from the "flexible" attachment characteristic of the elastic glue.

This injection of the epoxy resin may be effected very simply, for example, through use of a syringe, the needle of which may pierce the casing 14 at right angles to the sockets 19. The sockets then are filled to their limit.

Once the epoxy resin has hardened, a process which may be accelerated by temperature, the riders will be reinforced. As an example, the shearing stress of the glue of polysulfide is of the order of 10 to 15 kg/cm$^2$; whereas, the shearing stress of an epoxy resin is of the order of 200 to 250 kg/cm$^2$. Thus, if the wings of the rider to be glued to the glass sheet have a useful surface of approximately 5 cm$^2$ each, and the sockets, one for each wing, have an internal diameter of 6 mm, it has been possible to withstand shearing forces which are practically double, while maintaining the main advantages characteristic of an attachment using elastic glue.

The sockets 19, rather than shaped as simple cylindrical rings (FIG. 6), may be of a shape thereby to be imprisoned in apertures 18. In this form the rider and the socket will be integral. This form of socket may be seen in FIG. 8. Turning to this figure, the socket includes two diametrically opposed grooves 23 and two thrust bearings 24. These may be formed simultaneously by stamping. Although not shown, the apertures 18 will be formed with two lugs which interact with the grooves 23 thereby to prevent the socket from rotating in the aperture. The thrust bearings will be disposed on a line parallel to the base 22 of the rider. The extremity 25 opposite thrust bearings 24 is slightly widened so that its external diameter somewhat exceeds that of aperture 18. Thus, the socket can only perform two types of motion, one involving translation perpendicular to the glass sheet and the other a rocking motion around the two lugs of aperture 18. These movements, although of low amplitude, provide a perfect bearing of the socket against the glass sheet.

As described, the riders are attached in the factory at particular locations suitable for the anticipated use. As has also been described, the frame may be attached at the site according to the process illustrated schematically in FIG. 1.

The frame 3 may be of a U-shaped section provided along its base with apertures through which the shank of screws 4 may pass.

The assembly of the frame may be effected by interposing intermediate parts, as below, between the rider and the parts forming the sides of the frame for various reasons such as further distribution of the stresses between the frame and the riders and to provide or ensure tightness of the frame.

If the glass sheet has a low thickness tolerance the elasticity of the rider preferably will provide the necessary force to press the socket against the surface of the glass sheet during injection of the elastic glue.

Figure 9:
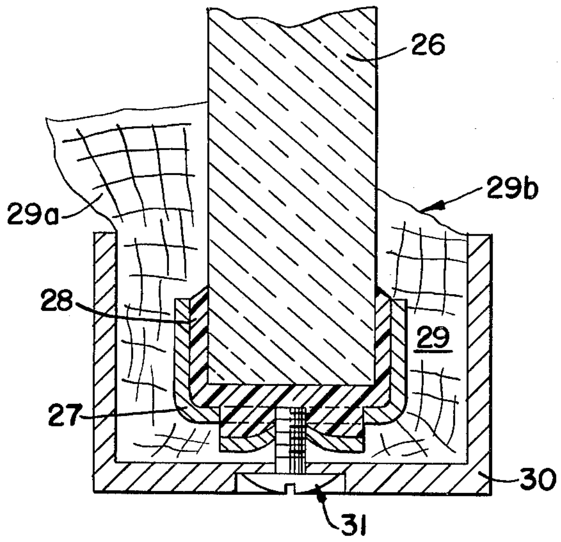
FIG. 9 is a view in section of the edge portion of a glass window, shaped parts of a frame and a volume of a cellular material providing an air seal.

According to the embodiment of the invention in FIG. 9, the glass sheet 26, following attachment of the riders 27, using glue 28, is covered on each side with a strip of flexible cellular plastic material 29. The cellular material has a width greater than the spacing between the glass sheet and frame 30 so that when the latter is then set into place and attached by means of screws 31 the strip 29 collapses to totally fill the space. The excess 29*a* of the cellular material is then eliminated using a cutting blade (not shown). The cut edge is shown at 29*b*.

FIG. 10 illustrates a half-section along the line X in FIG. 7 together with a frame 33 and a flexible joint 37. The glass window 32 is spaced from the sides of the frame and the flexible joint is received therebetween. The flexible joint may be received as a final step. Assisting in receipt are the inclined surfaces of bosses 21. Prior thereto, both the rider 34 and casing 14 will have been received as discussed in connection with the description of FIGS. 6 and 7. The casing in this embodiment has been retained in the received disposition. Also, the procedures whereby the elastic glue as well as the glue studs 35 of an epoxy glue within sockets 19 will have been carried out. As should be appreciated, the joint to the right side of the figure will be similarly completed and the flexible joint will provide the necessary tightness.

Figure 5:
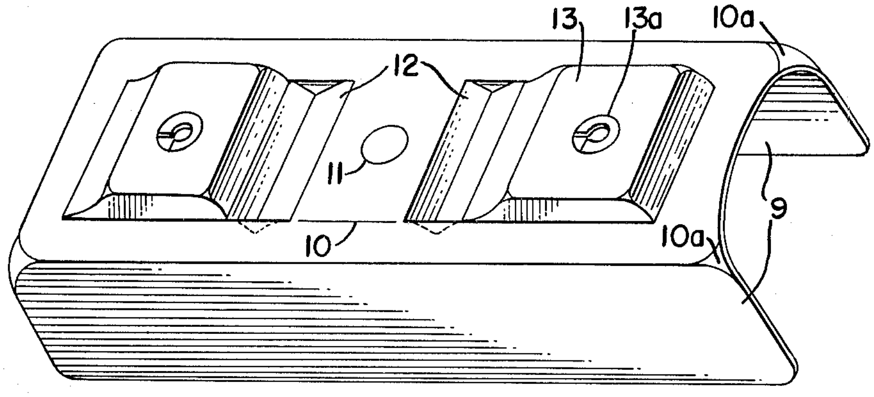
FIG. 5 is a view in perspective of one form of preformed part suitable for use in the present invention.
Figure 11:
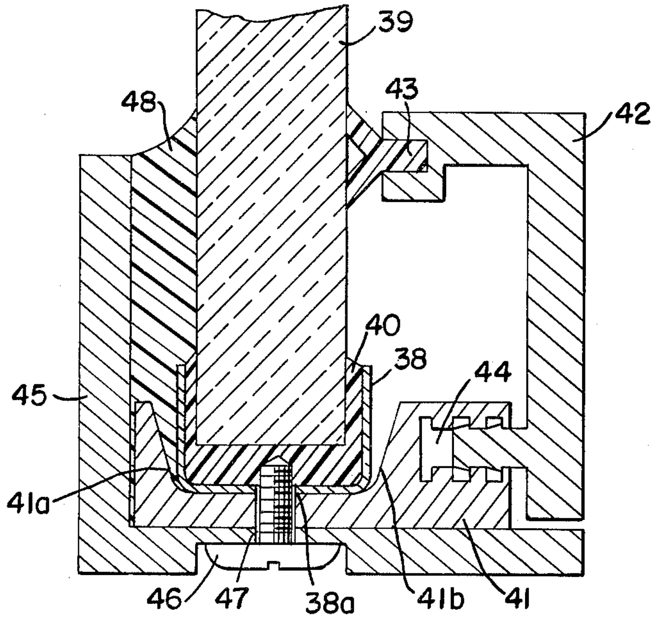
FIG. 11 is a view similar to that in FIG. 9, including the addition of a cushion frame.

A further embodiment of the invention may be seen in FIG. 11. This embodiment incorporates the use of a cushion frame for reasons as will become clear. As illustrated, a rider 38 which may be of the type as described in connection with FIG. 5 is received on a glass sheet 39 through the use of a layer of glue 40. The glue is a flexible glue and introduced to the space between the rider and glass sheet, as described. In this embodiment the casing has been removed preparatory to mounting of the cushion frame.

A cushion frame 42, provided with an air seal 43 made of an elastic extruded shaped part, is supported by an intermediate part 41. The intermediate part is described by a member formed of a plastic material such as polyvinyl chloride or the equivalent which is contoured to be received at and generally interlock on each of the riders 38. The interlock may be provided by a pair of inclined surfaces 41*a* and 41*b* which are positioned inwardly of a pair of shoulders. One of the shoulders is enlarged to provide a notched groove 44. The cushion frame is clipped into the notched groove in a manner such that the air seal is disposed on a surface or face of the glass sheet 39.

The intermediate parts 41, on the other side of the glass sheet, are covered by the frame 45, formed of a shaped metal part having a section disposed at right angles to a base. A screw 46 passing through an aperture 47 in the base opposite the nut 38*a* removably secures the frame to the rider 38. A flexible mastic 48, or a compressible cellular air seal, without any mechanical function, ensures the tightness between the glass sheet and the frame on this other side.

Figure 12:
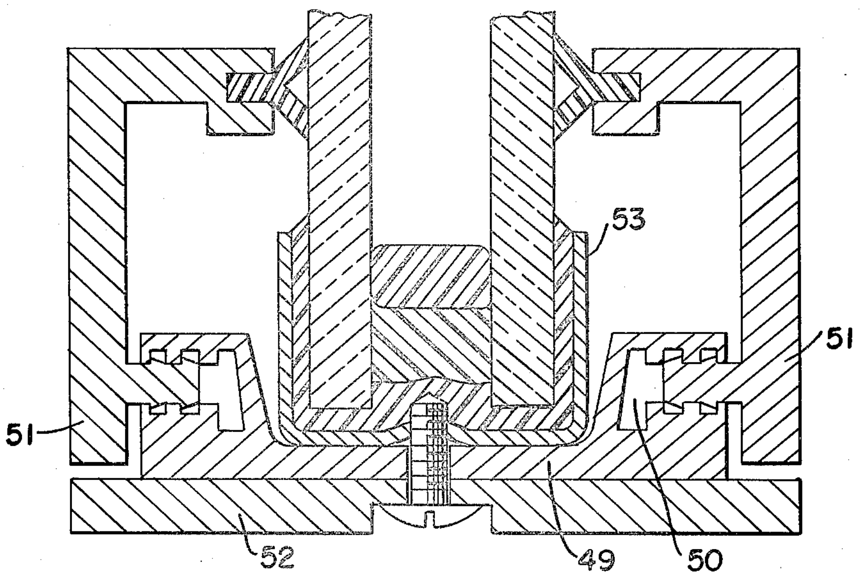
FIG. 12 is a view similar to FIG. 11 illustrating a pair of cushion frames received to both the right and left of a double glass window, and, FIG. 13 is a view similar to FIG. 11 illustrating a single cushion frame utilized with a double glass window.

FIG. 12 illustrates a panel like that of FIG. 11 having cushion frames on both faces of the glass sheet. In this form, the intermediate part 49 has a means of attachment, such as the notched grooves 50 in both shoulders for attachment of cushion frames 51. In this form the frame 52 is flat and the assembly of the frame is carried out as described above. Thus the intermediate part 49, of plastic material, is placed on each rider 53 on one and the same side of the panel, then the frame 52 is attached by an incomplete tightening of the screws which engage into the nut of the riders. The cushion frames 51 are easily set into place and the screws then are blocked.

Figure 13:
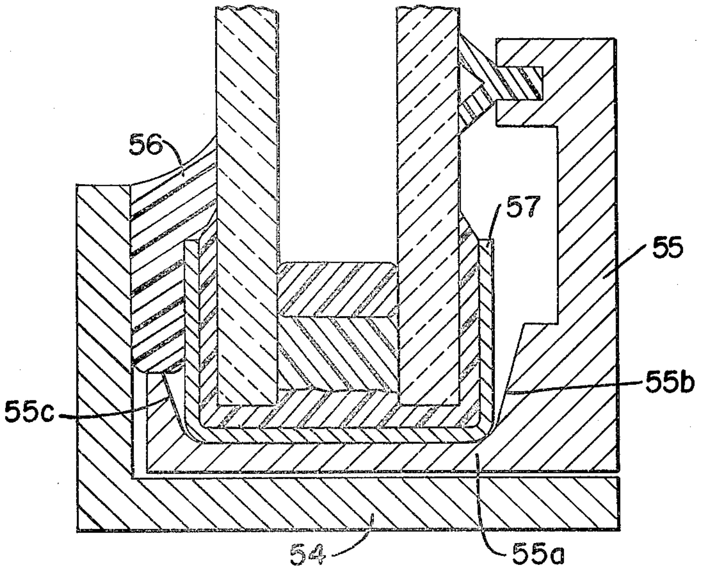

According to a further embodiment, illustrated in FIG. 13, the frame 54, again has an L-shaped section while the cushion frame and the intermediate part comprise an integral part 55. A flexible mastic 56 fills the space between the glass sheet of double thickness and the L-shaped section of the frame adjacent to it, thus, ensuring tightness on that face of the glass window. The wing 55*a* of part 55 advantageously comprises two longitudinal shoulders 55*b* and 55*c* which facilitate the receipt and positioning of part 55 on the rider 57.

Details already described regarding the riders, the intermediate parts or the shaped parts of the frame may be considered as consistent in the several forms, unless described otherwise.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

What is claimed is:

1. A process of making a panel comprising (a) a positioning plural spaced members along an edge of a glass sheet, (b) introducing an elastic adhesive between said members and said sheet and allowing said adhesive to set to bond said members to said sheet, (c) disposing a frame of channel outline around said members;

(d) inserting a strip of a preformed joint material between at least one side of said members and said frame, and (e) attaching said frame to said members with mechanical fasteners.

2. The process as recited in claim 1 wherein the elastic adhesive is of a polysulfide type glue.

3. The process as recited in claim 1 wherein the elastic adhesive is injected under pressure through a hole provided along the axis of symmetry of each spaced member.

4. The process as recited in claim 1, 2 or 3 wherein (a) said plural spaced members are positioned along an edge of at least one glass sheet, and (b) said spaced members each including (1) a base portion having a pair of wing portions extending from an edge normal thereto, and each said spaced member disposed at spaced locations around said glass sheet with said base portion located in opposed relation to the edge of said glass sheet and each said wing portion placed in projection to and slightly spaced from and disposed exteriorly of a respective outside face of said glass sheet, (2) attachment means carried by each said base adapted for removable attachment of said frame, (3) securing means comprising an adhesive layer disposed over an area substantially equal to the area of each said wing portion of said spaced member.

5. The process as recited in claim 4 wherein each said spaced member is formed of a spring steel having a thickness less than about 1 mm.

6. The process as recited in claim 4 wherein the elastic adhesive is disposed in a layer having a thickness of at least about 0.5 mm.

7. The process as recited in claim 4 wherein each said base of each said spaced member includes (a) an opening adapted to receive an elastic adhesive injection nozzle means, (b) a pair of ribs substantially equidistantly spaced from said opening, said ribs providing a bearing surface to space each said spaced member from said side of said glass sheet and serving to guide said elastic adhesive into the space between each said wing and said side, and (c) a boss disposed outwardly of each rib, said attachment means being carried by said bosses.

8. The process as recited in claim 4 further including means for assisting in the distribution of stress between said frame and each said spaced member, said distribution means formed of a material which is less rigid than that either of said frame and each said spaced member, and said distribution means being secured between said frame and each said rider.

9. The process as recited in claim 8 further including cushion frame means, and wherein said frame is of L-shaped outline to extend along a face of said glass sheet, a mastic material disposed between said frame and said bracket face and means of said distribution means for supporting said cushion frame means and disposition against the other face of said supported member.

10. The process as recited in claim 8 further including a pair of cushion frame means, and wherein said frame is in the form of a plate, and means on said distribution means for supporting said cushion frame means in disposition against each side of said glass sheet.

11. The process as recited in claim 4 wherein at least one of said wings of each said spaced member is provided with at least one opening therethrough, each said opening in each wing further comprising socket means, said socket means equal in number to the number of openings in said wings received in and close to the respective openings and to bear on a face of said glass sheet with which said wing is in projection, each socket having a central bore within a wall adapted to retain a charge of glue forming a stud which contacts and adheres to said face.

12. The process as recited in claim 11 wherein each said opening in each wing and wall of each said socket have complementary interacting means whereby each said socket is captive in a respective opening.

13. The process as recited in claim 11 wherein each of said wings of each said spaced member is provided with a circular opening therethrough, said openings being locked on a common axis perpendicular to the axis of symmetry of said spaced member.

14. The process as recited in claims 11, 12 or 13 wherein after the curing of the elastic adhesive:

(a) hard glue is introduced into the sockets, and (b) the hard glue is allowed to set into studs adhering to the glass.

* * * * *

UNITED STATES PATENT AND TRADEMARK OFFICE

CERTIFICATE OF CORRECTION

PATENT NO. : 4,237,597

DATED : December 9, 1980

INVENTOR(S) : Henri R. Auger

It is certified that error appears in the above-identified patent and that said Letters Patent are hereby corrected as shown below:

Column 10, line 46, "injection" should be -- injecting --;

Column 12, line 10, "locked" should be -- located --.

Signed and Sealed this

*Twelfth* Day of *May 1981*

[SEAL]

*Attest:*

RENE D. TEGTMEYER

*Attesting Officer*

*Acting Commissioner of Patents and Trademarks*